US012722365B2

(12) United States Patent
Uesaka et al.

(10) Patent No.: US 12,722,365 B2
(45) Date of Patent: Sep. 1, 2026

(54) FULL-GRAIN LEATHER-LIKE SHEET

(71) Applicant: Kuraray Co., Ltd., Kurashiki (JP)

(72) Inventors: Mitsuharu Uesaka, Okayama (JP); Yohei Takatori, Okayama (JP); Masato Warita, Okayama (JP)

(73) Assignee: Kuraray Co., Ltd., Okayama (JP)

( * ) Notice: Subject to any disclaimer, the term of this patent is extended or adjusted under 35 U.S.C. 154(b) by 294 days.

(21) Appl. No.: 18/706,090

(22) PCT Filed: Oct. 28, 2022

(86) PCT No.: PCT/JP2022/040422
§ 371 (c)(1),
(2) Date: Apr. 30, 2024

(87) PCT Pub. No.: WO2023/074858
PCT Pub. Date: May 4, 2023

(65) Prior Publication Data

US 2026/0158771 A1 Jun. 11, 2026

(30) Foreign Application Priority Data

Nov. 1, 2021 (JP) ................................ 2021-178919

(51) Int. Cl.
*B32B 27/12* (2006.01)
*B32B 5/02* (2006.01)
*B32B 27/40* (2006.01)

(52) U.S. Cl.
CPC .............. *B32B 27/12* (2013.01); *B32B 5/022* (2013.01); *B32B 27/40* (2013.01); *B32B 2250/04* (2013.01); *B32B 2307/7376* (2023.05)

(58) Field of Classification Search
None
See application file for complete search history.

(56) References Cited

U.S. PATENT DOCUMENTS

2008/0167398 A1 7/2008 Patil et al.
2013/0136913 A1 5/2013 Chiyonobu et al.

FOREIGN PATENT DOCUMENTS

CN 110670376 1/2020
JP 2000-230060 8/2000
JP 2002-249987 9/2002
JP 2003-138131 5/2003
JP 2003-155672 5/2003
JP 2003-201679 A 7/2003
JP 7196349 B1 * 12/2022 ............... D06N 3/14
WO WO-0046301 A1 * 8/2000 ............... D04H 1/42
WO 2012/017724 10/2013

OTHER PUBLICATIONS

Muto, JP-7196349-B1, Dec. 26, 2022 (machine translation) (Year: 2022).*
Takeda WO-0046301-A1, Aug. 10, 2000 (machine translation) (Year: 2000).*
International Preliminary Report on Patentability dated May 16, 2024, in PCT/JP2022/040422, with English translation, 9 pages.
Extended European Search Report issued in European Patent Application No. 22887183.6 dated Nov. 3, 2025, 8 pages.
International Search Report received for PCT Application No. PCT/JP2022/040422, dated Jan. 17, 2023, 5 pages with English translation.

* cited by examiner

*Primary Examiner* — Cheng Yuan Huang
(74) *Attorney, Agent, or Firm* — Grüneberg Global IP, PLLC

(57) ABSTRACT

Disclosed is a grain-finished leather-like sheet including: a fiber substrate; and a resin layer stacked on one side of the fiber substrate, wherein the resin layer includes at least a skin layer, and the skin layer includes a polyurethane, a nonionic compound having an HLB value of 10 to 16, and a water-soluble polymer, and has surface free energy including a polar component of 25 to 40 $mJ/m^2$ and a dispersive component of 30 to 40 $mJ/m^2$, as analyzed according to the OWRK method.

16 Claims, 1 Drawing Sheet

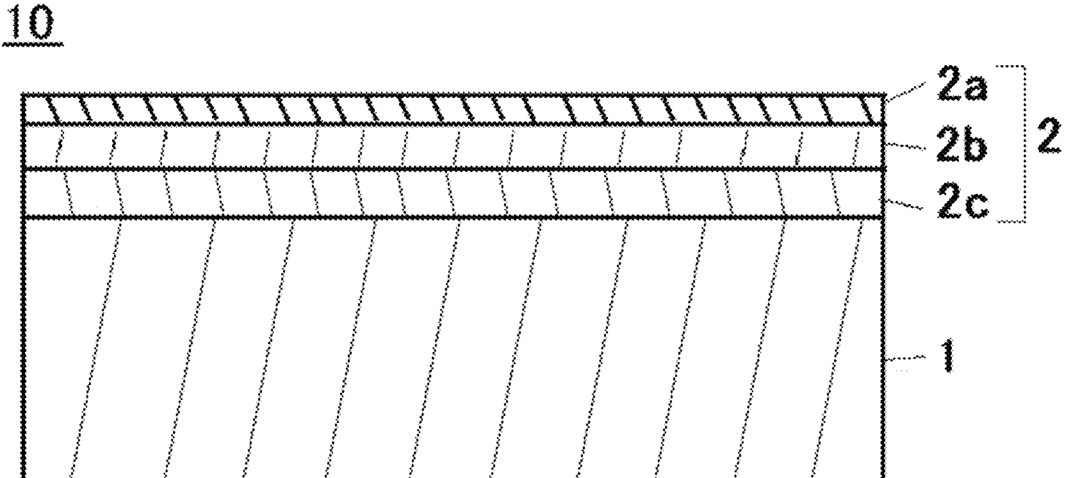
10
2a
2b
2c
2
1

FULL-GRAIN LEATHER-LIKE SHEET

CROSS-REFERENCE TO RELATED APPLICATIONS

This application is the National Stage entry under § 371 of International Application No. PCT/JP2022/040422, filed on Oct. 28, 2022, and which claims the benefit of priority to Japanese Application No. 2021-178919, filed on Nov. 1, 2021. The content of each of these applications is hereby incorporated by reference in its entirety.

TECHNICAL FIELD

The present invention relates to a grain-finished leather-like sheet that combines high wettability, high water resistance, and high secondary adhesion.

BACKGROUND ART

Grain-finished leather-like sheets, such as an artificial leather sheet and a synthetic leather sheet, that include a grain-like resin layer are known as the materials of shoes, bags, clothing, and so forth. A commonly used grain-finished leather-like sheet includes a fiber substrate, and a resin layer stacked on the fiber substrate and including a polyurethane.

In recent years, the production of grain-finished leather-like sheets requires a production method in which the amount of usage of an organic solvent is reduced in order to reduce the environmental load. This method uses an aqueous polyurethane liquid such as an emulsion obtained by dispersing, in an aqueous medium, an aqueous polyurethane dispersible in an aqueous medium. For example, PTL 1 listed below discloses a grain-finished artificial leather including a grain layer formed using an aqueous polyurethane resin dispersion on at least one side of a substrate layer composed of a three-dimensionally entangled non-woven fabric and an elastic polymer applied using an aqueous resin dispersion.

PTL 2 listed below discloses a production method of a porous structure for use in production of a leather-like sheet. The method includes: applying, to a substrate, a mixed solution including (A) an aqueous thermoplastic binder liquid, (B) a urethane prepolymer-terminal isocyanate block, and at least one selected from the group consisting of (C) an inorganic compound, (D) a water-soluble organic polymer, and (E) a high-cloud-point surfactant; thereafter subjecting the whole to wet heating using steam, or heating using high-frequency heating or high-frequency dielectric heating in combination, to form a porous body; and drying the porous body.

Meanwhile, processing a grain-finished leather-like sheet into a secondary products such as shoes, a bag, and clothing requires surface treatment and secondary adhesion for the grain-like resin layer. The surface treatment of a grain-finished leather-like sheet is, for example, a treatment involving applying a treating liquid containing a pigment, a matting agent, an antimicrobial, and the like to a surface of the resin layer by gravure coating or the like, thus adjusting the properties of the surface. The secondary adhesion of a grain-finished leather-like sheet is adhesion thereof when another material is bonded to a surface of the grain-like resin layer using an adhesive.

When a polyurethane for forming a grain-like resin layer is an aqueous polyurethane formed using an aqueous polyurethane liquid, the aqueous polyurethane liquid often contains an aqueous polyurethane having relatively high hydrophobicity in order to maintain the storage stability of the aqueous polyurethane liquid. When such an aqueous polyurethane liquid containing an aqueous polyurethane having relatively high hydrophobicity is used to form a grain-like resin layer, the hydrophobicity of the surface of the resin layer is also increased, resulting in the problem of reduced wettability of the resin layer with an aqueous treating liquid having high polarity.

In order to solve such a problem, for example, PTL 3 listed below discloses a leather-like sheet produced by applying, onto a release sheet, a skin layer-forming urethane resin composition containing an aqueous polyurethane and drying the resin composition to form a skin layer, and stacking the skin layer and a fiber substrate with an adhesive interposed therebetween. Also, PTL 3 discloses adjusting the ratio between the hydrophilic component and the hydrophobic component to increase the polarity of the aqueous polyurethane, thus increasing the secondary adhesion while maintaining the water resistance.

CITATION LIST

Patent Literatures

[PTL 1] Japanese Laid-Open Patent Publication No. 2003-155672

[PTL 2] Japanese Laid-Open Patent Publication No. 2002-249987

[PTL 3] WO 2012/017724

SUMMARY OF INVENTION

Technical Problem

In order to produce a grain-finished leather-like sheet having high water resistance, a resin layer including a polyurethane having high water resistance is often used. If the water resistance of the surface of the resin layer is increased in the leather-like sheet disclosed in PTL 3, the polarity is less likely to be sufficiently increased. Therefore, it seems that sufficiently high wettability with the aqueous liquid required to perform surface treatment using a treating liquid having high polarity cannot be achieved if the water resistance is further increased in the leather-like sheet disclosed in PTL 3. Further, it seems that the water resistance is reduced if the ratio of the hydrophilic component in the polyurethane is increased in order to further increase the wettability of the surface of the resin layer. As such, there is a tradeoff relationship between the wettability and the water resistance of the surface of the resin layer.

As stated above, the grain-finished leather-like sheet may be required to have high secondary adhesion in some cases. The conventional resin layers including an aqueous polyurethane have low secondary adhesion although they have high wettability.

As described thus far, a grain-finished leather-like sheet that combines high wettability with an aqueous liquid, high water resistance, and high secondary adhesion has not yet been obtained.

It is an object of the present invention to provide a grain-finished leather-like sheet that combines high wettability with an aqueous liquid, high water resistance, and high secondary adhesion.

Solution to Problem

An aspect of the present invention relates to a grain-finished leather-like sheet including: a fiber substrate; and a resin layer stacked on one side of the fiber substrate, wherein the resin layer includes at least a skin layer. The skin layer includes a polyurethane, a nonionic compound having an HLB value of 10 to 16, and a water-soluble polymer, and has surface free energy including a polar component of 25 to 40 mJ/m$^2$ and a dispersive component of 30 to 40 mJ/m$^2$, as analyzed according to the Owens-Wendt-Rabel-Kaelble method (hereinafter may also be referred to as the OWRK method. With such a grain-finished leather-like sheet, it is possible to obtain a grain-finished leather-like sheet including a resin layer surface that combines high wettability, high water resistance, and high secondary adhesion. Note that such a polyurethane is usually an aqueous polyurethane that is dispersible in an aqueous medium.

It is preferable that the polyurethane has surface free energy including a polar component of 5 to 20 mJ/m$^2$ and a dispersive component of 30 to 40 mJ/m$^2$, as analyzed according to the OWRK method, from the viewpoint of ease of obtaining a grain-finished leather-like sheet that combines high wettability, high water resistance, and high secondary adhesion.

It is preferable that the nonionic compound includes at least one of a silicone-based compound and an acetylene glycol-based compound, because even a small amount of addition of these compounds can significantly enhance the surface free energy.

It is preferable that the skin layer includes the nonionic compound in an amount of 0.8 to 5.0 mass %, because sufficient wettability is likely to be maintained without reducing the water resistance and the secondary adhesion.

It is preferable that the water-soluble polymer has a number-average molecular weight of 10,000 to 150,000, and it is also preferable that the skin layer includes the water-soluble polymer in an amount of 1.0 to 10 mass %, because high secondary adhesion is likely to be maintained without reducing the water resistance.

It is preferable that the skin layer is a poreless continuous film having a thickness of 10 to 100 μm, from the viewpoint of obtaining an elegant appearance without any depression-like recess on the surface of the skin layer.

It is preferable that the resin layer includes at least an adhesion layer that bonds the fiber substrate, the adhesion layer including a polyurethane and having a thickness of 30 to 120 μm, from the viewpoint of firmly bonding the resin layer to the fiber substrate.

Advantageous Effects of Invention

According to the present invention, it is possible to obtain a grain-finished leather-like sheet that combines high wettability with an aqueous liquid, high water resistance, and high secondary adhesion.

BRIEF DESCRIPTION OF DRAWING

FIG. 1 A schematic cross-sectional view illustrating a layer configuration of a grain-finished leather-like sheet 10, which is an example of an embodiment.

DESCRIPTION OF EMBODIMENT

Hereinafter, the present invention will be described in detail with reference to an embodiment of the grain-finished leather-like sheet.

Referring to FIG. 1, a grain-finished leather-like sheet 10, which is an example of the embodiment, includes a fiber substrate 1, and a resin layer 2 stacked on one side of the fiber substrate 1. The resin layer 2 includes a skin layer 2*a*, an intermediate layer 2*b*, and an adhesion layer 2*c*.

The adhesion layer 2*c* is a layer that is mainly composed of a polyurethane and that is disposed to bond the resin layer 2 to the fiber substrate 1. The intermediate layer 2*b* interposed between the skin layer 2*a* and the adhesion layer 2*c* is a layer that is mainly composed of a polyurethane being selected according to purpose such as adjustment of the surface texture.

The skin layer 2*a* is a layer that is mainly composed of a polyurethane and that is disposed preferably as the outermost layer of the resin layer in order to impart high wettability, high water resistance, and high secondary adhesion to the surface of the resin layer. Specifically, the skin layer 2*a* is a layer that is mainly composed of a polyurethane, that includes at least a polyurethane, and a nonionic compound having an HLB value of 10 to 16, and a water-soluble polymer, and that has surface free energy including a polar component of 25 to 40 mJ/m$^2$ and a dispersive component of 30 to 40 mJ/m$^2$, as analyzed according to the OWRK method.

The grain-finished leather-like sheet according to the present embodiment, as illustrated as the grain-finished leather-like sheet 10, includes a resin layer that is stacked on one side of the fiber substrate, and that includes at least a skin layer including at least a polyurethane, a nonionic compound having an HLB value of 10 to 16, and a water-soluble polymer. Such a resin layer imparts a grain-finished appearance to the grain-finished leather-like sheet. As stated above, the resin layer may include, as necessary, an adhesion layer disposed for bonding the skin layer and the fiber substrate to each other, an intermediate layer for adjusting the surface texture, and so forth.

The fiber substrate is a woven fabric, a knitted fabric, a non-woven fabric, or a fiber-entangled body made of a combination thereof. Among these, a non-woven fabric is particularly preferred from the viewpoint of retaining a flexible texture. The fiber substrate may contain an elastic polymer that is impregnated into voids of the fiber-entangled body.

The resin that forms the fibers is not particularly limited. Specific examples thereof include aromatic polyesters such as polyethylene terephthalate (PET), isophthalic acid-modified polyethylene terephthalate, sulfoisophthalic acid-modified polyethylene terephthalate, polybutylene terephthalate, and polyhexamethylene terephthalate; aliphatic polyesters such as polylactic acid, polyethylene succinate, polybutylene succinate, polybutylene succinate adipate, and a polyhydroxybutyrate-polyhydroxyvalerate copolymer; nylons such as nylon 6, nylon 66, nylon 10, nylon 11, nylon 12, and nylon 6-12; polyolefins such as polypropylene, polyethylene, polybutene, polymethylpentene, and a chlorine-based polyolefin; modified polyvinyl alcohols such as a modified polyvinyl alcohol containing 25 to 70 mol % of an ethylene unit; and elastomers such as a polyurethane-based elastomer, a polyamide-based elastomer, and a polyester-based elastomer. Among these, PET, isophthalic acid-modified polyethylene terephthalate, polylactic acid, nylon 6, nylon 12, nylon 6-12, a nylon copolymer, and polypropylene are particularly preferred from the viewpoint of the excellent spinnability and the excellent mechanical properties of the resulting artificial leather. These resins may be used alone or in combination of two or more.

Although the fineness of the fibers that form the fiber substrate is not also particularly limited, it is particularly preferable that the fibers are preferably ultrafine fibers having an average fineness of, for example, 0.001 to 0.5 dtex from the viewpoint of obtaining a flexible texture.

The fiber substrate may contain an elastic polymer that is impregnated into voids of the fiber-entangled body. Specific examples of the elastic polymer that is impregnated into voids of the fiber-entangled body include polyurethanes, acrylonitrile-based elastomers, olefin-based elastomers, polyester-based elastomers, polyamide-based elastomers, and acrylic elastomers. Among these, a cross-linked aqueous polyurethane obtained by solidifying a polyurethane emulsion is particularly preferred because the amount of usage of an organic solvent can be reduced.

The content ratio of the elastic polymer in the fiber substrate is not particularly limited, but is preferably 5 to 60 mass %, and more preferably 8 to 40 mass %. The thickness of the fiber substrate is not particularly limited, but is preferably 0.2 to 3.0 mm.

The grain-finished leather-like sheet according to the present embodiment, as illustrated as the grain-finished leather-like sheet 10, includes a resin layer that is stacked on one side of the fiber substrate, and that includes at least a skin layer including at least a polyurethane, a nonionic compound having an HLB value of 10 to 16, and a water-soluble polymer. Such a resin layer imparts a grain-finished appearance to the grain-finished leather-like sheet. As stated above, the resin layer may include, as necessary, an adhesion layer disposed for bonding the skin layer and the fiber substrate to each other, an intermediate layer for adjusting the surface texture, and so forth.

Preferably, the polyurethane in the present embodiment is an aqueous polyurethane derived from from a polyurethane aqueous dispersion that is an emulsion or dispersion in which a polyurethane or a prepolymer thereof is dispersed in water or an aqueous medium mainly composed of water. The aqueous polyurethane is a polyurethane distinguished from a solvent-based polyurethane derived from a polyurethane solution dissolved in an organic solvent. The aqueous polyurethane is, for example, a polyurethane obtained by reacting an urethane raw material including a polymer polyol, an organic polyisocyanate, a chain extender, and a multifunctional compound, which is used as necessary.

Specific examples of the polymer polyol include polyether-based polyols such as polyethylene glycol, polypropylene glycol, polytetramethylene glycol, and poly(methyl tetramethylene glycol), and copolymers thereof; polyester-based polyols such as polybutylene adipate diol, polybutylene sebacate diol, polyhexamethylene adipate diol, poly(3-methyl-1,5-pentylene adipate)diol, poly(3-methyl-1,5-pentylene sebacate)diol, and polycaprolactone diol, and copolymers thereof; polycarbonate-based polyols such as polyhexamethylene carbonate diol, poly(3-methyl-1,5-pentylene carbonate)diol, polypentamethylene carbonate diol, and polytetramethylene carbonate diol, and copolymers thereof; and polyester carbonate polyol. As necessary, a multifunctional alcohol such as a trifunctional alcohol and a tetrafunctional alcohol, or a short-chain alcohol such as ethylene glycol may be used in combination. These may be used alone or in combination of two or more.

Specific examples of the organic polyisocyanate include non-yellowing diisocyanates, including aliphatic or alicyclic diisocyanates such as hexamethylene diisocyanate, isophorone diisocyanate, norbornene diisocyanate, and 4,4'-dicyclohexylmethane diisocyanate; and aromatic diisocyanates such as 2,4-tolylene diisocyanate, 2,6-tolylene diisocyanate, 4,4'-diphenylmethane diisocyanate, and xylylene diisocyanate. As necessary, a multifunctional isocyanate such as a trifunctional isocyanate may also be used in combination. These may be used alone or in combination of two or more.

Specific examples of the chain extender include diamines such as hydrazine, ethylene diamine, propylene diamine, hexamethylene diamine, nonamethylene diamine, xylylene diamine, isophorone diamine, piperazine and derivatives thereof, adipic acid dihydrazide, and isophthalic acid dihydrazide; triamines such as diethylenetriamine; tetramines such as triethylenetetramine; diols such as ethylene glycol, propylene glycol, 1,4-butanediol, 1,6-hexanediol, 1,4-bis(β-hydroxyethoxy)benzene, and 1,4-cyclohexanediol; triols such as trimethylol propane; tetraols such as pentaerythritol; amino alcohols such as amino ethyl alcohol and amino propyl alcohol. These may be used alone or in combination of two or more.

Examples of the crosslinking agent include crosslinking agents that form a crosslinked structure with a hydroxyl group or an amino group, including bifunctional polyisocyanate compounds; and multifunctional isocyanate compounds such as a biuret-type isocyanate compound, an adduct-type isocyanate compound, and an isocyanurate-type isocyanate compound; and crosslinking agents that form a crosslinked structure with a carboxyl group, including compounds having a carbodiimide group, an oxazoline group, an epoxy group, a cyclo carbonate group, or an aziridine group, and hydrazine derivatives or hydrazide derivatives. These may be used alone or in combination of two or more. In the case of using the crosslinking agent, the mixing ratio of the crosslinking agent relative to the aqueous polyurethane is preferably 2 to 20 mass %.

The skin layer that is preferably disposed as the outermost layer of the resin layer is a layer that includes at least a polyurethane, a nonionic compound having an HLB value of 10 to 16, and a water-soluble polymer, and that has surface free energy including a polar component of 25 to 40 mJ/m$^2$ and a dispersive component of 30 to 40 mJ/m %, analyzed according to the OWRK method. Preferably 90 mass, or more, and more preferably 95 mass % or more of the resin component included in the skin layer is constituted by the aqueous polyurethane.

Here, surface free energy is a surface tension constituted by a sum of intermolecular force components of a solid. A polar component and a dispersive component of surface free energy, as analyzed according to the Owens-Wendt-Rabel-Kaelble method (OWRK method), are each an intermolecular force component of surface free energy, as analyzed according to the OWRK method. The polar component reflects an orientation force of the solid, and the dispersive component reflects a dispersive force of the solid.

The skin layer of the present embodiment has surface free energy including a polar component of 25 to 40 mJ/m$^2$ and a dispersive component of 30 to 40 mJ/m$^2$, as analyzed according to the OWRK method. The skin layer having such polar component and dispersive component of surface free energy results in a grain-finished leather-like sheet well-balanced in water resistance and wettability.

If the polar component of the surface free energy of the skin layer is less than 25 mJ/m$^2$, the wettability is likely to be reduced. If the polar component of the surface free energy of the skin layer is greater than 40 mJ/m$^2$, the secondary adhesion is likely to be reduced. If the dispersive component of the surface free energy of the skin layer is less than 30 mJ/m$^2$, there is a tendency that the secondary adhesion is likely to be reduced. If the dispersive component of the surface free energy of the skin layer is greater than 40 mJ/m$^2$, the wettability is likely to be reduced.

The skin layer having such surface free energy can be obtained by adjusting the type of the polyurethane included in the skin layer, and the types and the addition proportions of a nonionic compound having an HLB value of 10 to 16 and a water-soluble polymer, which are added to adjust the surface free energy of the skin layer.

As the polyurethane included in the skin layer, it is preferable to use an aqueous polyurethane that has surface free energy including a polar component of preferably 3 to 25 mJ/m$^2$, and more preferably 10 to 20 mJ/m$^2$, and a dispersive component of 30 to 40 mJ/m$^2$. Here, the surface free energy of the polyurethane means the surface free energy of the polyurethane, not including a nonionic compound having an HLB value of 10 to 16 and a water-soluble polymer.

The polar component and the dispersive component of the surface free energy of the polyurethane can be varied by adjusting the ratio between a hydrophilic component and a hydrophobic component of a soft segment derived from a polymer polyol unit of the polyurethane.

Specifically, the polar component is increased when the ratio of the hydrophilic component of the polymer polyol is increased, and the dispersive component is increased when the ratio of the hydrophobic component is increased. Also, when the polar component of the surface free energy of the polyurethane is large, the polar component of the surface free energy of the skin layer also becomes large. When the dispersive component of the surface free energy of the polyurethane is large, the dispersive component of the surface free energy of the skin layer also becomes large.

The hydrophilic component of the soft segment is derived from a polymer polyol unit including a repeating structure having 1 to 3 carbon atoms excluding an ester bond. Specific examples of such a polymer polyol serving as the hydrophilic component include polymer polyols having 2 carbon atoms, such as polyethylene glycol, and polymer polyols having 3 carbon atoms, such as polypropylene glycol.

The hydrophobic component of the soft segment is derived from a polymer polyol unit including a repeating structure having 4 to 6 carbon atoms excluding an ester bond. Specific examples of such a polymer polyol serving as the hydrophobic component include polymer polyols having 4 carbon atoms, such as polytetramethylene glycol, polymer polyols having 5 carbon atoms, such as polypentamethylene glycol, and polymer polyols having 6 carbon atoms, such as polyhexamethylene carbonate diol.

It is preferable that the polar component of the surface free energy of the polyurethane, adjusted as described above, is preferably 3 to 25 mJ/m$^2$, and more preferably 10 to 20 mJ/m$^2$, from the viewpoint of maintaining the water resistance while also achieving excellent secondary adhesion. If the polar component of the surface free energy of the polyurethane is too small, the polar component of the skin layer also becomes small, so that adhesion to an adhesive, a thermoplastic urethane resin, and the like tends to be reduced, resulting in a reduction in the secondary adhesion. If the polar component of the surface free energy of the polyurethane is too large, the polar component of the skin layer also becomes large, as a result of which the water resistance tends to be reduced although the secondary adhesion is increased.

It is preferable that the dispersive component of the surface free energy of the polyurethane is 30 to 40 mJ/m$^2$ from the viewpoint of achieving excellent balance between the water resistance and the secondary adhesion. If the dispersive component of the surface free energy of the polyurethane is too small, the secondary adhesion tends to be reduced.

Specific examples of such a polyurethane include aqueous polyurethanes contained in HYDRAN ULK-190, HYDRAN ULK-003, and the like manufactured by DIC Corporation, which are emulsions of polyurethanes.

The skin layer includes a nonionic compound having an HLB value of 10 to 16. An HLB (Hydrophilic-Lipophilic Balance) value is a value representing a degree of affinity of a surfactant for water and oil. The HLB value takes on values from 0 to 20. The closer the value is to 0, the higher the lipophilicity, and the closer the value is to 20, the higher the hydrophilicity. Blending a nonionic compound having an HLB value of 10 to 16 in the skin layer can increase the surface free energy of the skin layer, thus increasing the wettability required to surface-treat the skin layer. The HLB value can be calculated by, for example, Griffin's method from an HLB value=20×(total sum of molecular weights of hydrophilic portions/overall molecular weight).

Blending a nonionic compound having an HLB value of 10 to 16 in the skin layer can increase the polar component of the surface of the skin layer, thus increasing the wettability. On the other hand, blending a nonionic compound having an HLB value of 10 to 16 in the skin layer is not likely to increase the secondary adhesion.

If the HLB value of the nonionic compound is less than 10, there is a tendency that the excessively low hydrophilicity of the nonionic compound prevents the polar component of the surface free energy of the skin layer from being sufficiently increased. If the HLB value of the nonionic compound is greater than 16, there is a tendency that the excessively high hydrophilicity of the nonionic compound reduces the water resistance of the skin layer.

Specific examples of the nonionic compound having an HLB value of 10 to 16 include compounds having an HLB value of 10 to 16, including a silicone-based compound such as polysiloxane (e.g., a polyether-modified polydimethylsiloxane), an acetylene glycol-based compound, a polyoxyethylene alkyl ether-based compound, a polyoxyethylene alkyl allyl ether-based compound, a polyoxyethylene-polyoxypropylene block copolymer-based compound, and a fluorine-based compound such as an organic fluoro compound. These may be used alone or in combination of two or more. Among these, it is preferable to use a silicone-based compound or an acetylene glycol-based compound, in particular, a polyether-modified polydimethylsiloxane compound, because a small of amount of addition thereof can significantly enhance the surface free energy.

The content ratio of the nonionic compound having an HLB value of 10 to 16 in the skin layer is preferably 0.8 to 5.0 mass %, and more preferably 1.2 to 4.0 mass %. If the content ratio of the nonionic compound having an HLB value of 10 to 16 is too low, there is a tendency that the wettability is not sufficiently increased as a result of the surface free energy of the skin layer being not sufficiently enhanced. If the content ratio of the nonionic compound having an HLB value of 10 to 16 is too high, there is concern that the nonionic compound may bleed to the surface of the skin layer, thus reducing the water resistance and the secondary adhesion.

Also, the skin layer includes a water-soluble polymer. A water-soluble polymer has a large polar component of surface free energy, and therefore easily enters the network of molecules of the aqueous polyurethane contained in the skin layer. Thus, the polar component of the skin layer is increased to increase the secondary adhesion.

As stated above, the polar component of the polyurethane can be increased by increasing the ratio of the hydrophilic component of the soft segment of the polyurethane. However, if the polar component is excessively increased by increasing the ratio of the hydrophilic component of the soft segment of the polyurethane, the water resistance is reduced as a result of the polyurethane becoming more likely to be swollen with water. In the skin layer of the present embodiment, blending a water-soluble polymer allows the secondary adhesion to be selectively increase, without excessively increasing the polar component of the polyurethane to reduce the water resistance.

A water-soluble polymer is a polymer that can be prepared, by being mixed with water, into a solution in which 10 g or more of the polymer is dissolved in 1 L of water. Specific examples thereof include polyurethane-modified polyoxyalkylene, polyethylene glycol, polyvinyl alcohol, and polyvinyl pyrrolidone. These may be used alone or in combination of two or more. Among these, polyurethane-modified polyoxyalkylene is particularly preferred in that it strongly interacts with the aqueous polyurethane and thus can easily enter the network of molecules of the polyurethane contained in the skin layer, whereby the polar component of the skin layer is likely to be increased.

The water-soluble polymer has a number-average molecular weight of 10,000 or more, preferably 10,000 to 150,000, and more preferably 30,000 to 120,000. If the number-average molecular weight is too low, the effect of increasing the secondary adhesion tends to be reduced. If the number-average molecular weight is too high, the water resistance tends to be reduced.

The content ratio of the water-soluble polymer in the skin layer is preferably 1.0 to 10 mass %, and more preferably 2.0 to 8.0 mass %. If the content ratio of the water-soluble polymer is too low, there is a tendency that the polar component of the surface free energy of the skin layer is not sufficiently increased. If the content ratio of the water-soluble polymer is too high, there is concern that the water resistance of the skin layer may be reduced.

The skin layer may contain, as necessary, additives such as an antifoaming agent, a leveling agent, a thickener, a pigment, a dye, a matting agent, an organic solvent, and resin beads as long as the effects of the present invention are not impaired.

The thickness of the skin layer is not particularly limited, but is preferably 10 to 100 μm, and more preferably 10 to 50 μm. The thickness of the skin layer can be calculated, for example, from a cross-sectional scanning electron microscope (SEM) image.

It is preferable that the skin layer is a poreless continuous film from the viewpoint of obtaining an elegant appearance without any depression-like recess on the surface of the skin layer. If the skin layer has pores, depression-like recesses are formed on the skin layer surface when processing the grain-finished leather-like sheet into a secondary product, which may result in a poor appearance.

The resin layer included in the grain-finished leather-like sheet of the present embodiment includes at least the above-described skin layer, and may further include, as necessary, other layers including a resin, such as an adhesion layer disposed for bonding the skin layer to a fiber substrate, and an intermediate layer for adjusting the surface texture.

Next, an example of a production method of a grain-finished leather-like sheet according to the present embodiment will be described. The production method of a grain-finished leather-like sheet according to the present embodiment is similar to conventional production methods of a grain-finished leather-like sheet except that the resin layer that provides a grain-finished appearance contains the above-described skin layer.

For example, the above-described fiber substrate is prepared, and a resin layer for providing a grain-finished appearance is formed on one side of the fiber substrate. Specifically, this is performed using, for example, dry forming involving bonding, to the surface of the fiber substrate, a film to constitute a resin layer that is formed on release paper, and releasing the release paper, whereby the resin layer is stacked on and bonded to the fiber substrate.

Specifically, first, a skin-layer coating liquid for forming a skin layer is applied onto release paper, and dried, to form a film to constitute a skin layer.

The skin-layer coating liquid is prepared by mixing an aqueous polyurethane liquid such as an emulsion or dispersion containing an aqueous polyurethane, a nonionic compound having an HLB value of 10 to 16, and a water-soluble polymer, as well as a crosslinking agent and an additive that are blended as necessary. It is preferable that the water-soluble polymer and the nonionic compound having an HLB value of 10 to 16 are also blended in the form of liquid such as an aqueous solution or oil from the viewpoint of facilitating mixing.

The solid concentration of the aqueous polyurethane in the aqueous polyurethane liquid is not particularly limited, but is preferably about 20 to 60 mass %. The solid concentration of the aqueous solution of the water-soluble polymer is also not particularly limited, but is preferably about 20 to 60 mass %.

Then, the skin-layer coating liquid is applied onto the release paper, and dried. The drying condition is not particularly limited, but is preferably a condition that drying is performed for 1 to 10 minutes at 70 to 130° C. In this manner, a film to constitute a skin layer is formed on the release paper.

Then, films to constitute an intermediate layer and an adhesion layer are formed on the surface of the film to constitute a skin layer that is formed on the release paper. The resin for forming the intermediate layer and the adhesion layer is not particularly limited, but is preferably a polyurethane because of the excellent adhesion to other layers. From the viewpoint of reducing the amount of usage of an organic solvent, it is particularly preferable that the resin is an aqueous polyurethane.

The polyurethane used for the adhesion layer may be a solvent-based polyurethane that is dissolved in an organic solvent or the like, or may be an aqueous polyurethane. However, it is particularly preferable that the polyurethane is an aqueous polyurethane from the viewpoint of reducing the organic solvent. Preferably, a crosslinking agent is blended in the adhesion layer in order to increase the adhesion to the substrate.

As the crosslinking agent for the polyurethane used for the adhesion layer, known crosslinking agents for polyurethanes can be used without any particular limitation. Specific examples thereof include epoxy compounds, aziridine compounds, carbodiimide compounds, organic polyisocyanate compounds, oxazoline compounds, melamine formamide compounds, and urea methylol compounds. These may be used alone or in combination of two or more.

The intermediate layer is a layer that is disposed as necessary in order to adjust the thickness of the grain-like resin layer of the grain-finished leather-like sheet. The polyurethane used for the intermediate layer may also be a solvent-based polyurethane that is dissolved in an organic solvent or the like, or may be an aqueous polyurethane.

However, it is preferable that the polyurethane is an aqueous polyurethane from the viewpoint of reducing the organic solvent.

The adhesion layer is formed by applying an adhesion-layer coating liquid to a surface of the film to constitute a skin layer that is formed on release paper, and drying the adhesion-layer coating liquid. In the case of forming an intermediate layer, the intermediate layer is formed by applying an intermediate-layer coating liquid to a surface of the film to constitute a skin layer that is formed on the release paper, and drying the intermediate-layer coating liquid. When the intermediate layer has been formed, the adhesion layer is formed by applying the adhesion-layer coating liquid to the surface of a stacked film of the skin layer and the intermediate layer formed on the release paper, and drying the adhesion-layer coating liquid. Each of the layers may be a single layer, or may be composed of a plurality of layers made of coating liquids having different compositions. The film to constitute the intermediate layer, and the film to constitute the adhesion layer are also formed in the same manner as the film to constitute the skin layer.

The thickness of the intermediate layer is not particularly limited, but is preferably 10 to 50 μm, and more preferably 20 to 40 μm. The thickness of the adhesion layer is also not particularly limited, but is preferably about 30 to 130 μm, and more preferably about 50 to 100 μm.

Then, the resulting superposed body (adhesion layer/skin layer/release paper, or adhesion layer/intermediate layer/skin layer/release paper) is stacked on the surface of the fiber substrate with the adhesion layer interposed between the superposed body and the fiber substrate, and the whole is pressed using a clearance roll or the like, to bond the resin layer to the surface of the fiber substrate. As necessary, the resulting structure may be aged for 1 to 3 days at 40 to 90° C., to accelerate cross-linking of the polyurethane contained in the adhesion layer. The release paper is released from a laminate obtained in this manner, to obtain a grain-finished leather-like sheet.

The grain-finished leather-like sheet obtained in this manner has excellent processability of secondary products such as shoes, bags, and clothing. Specifically, when a treating liquid containing a pigment, a matting agent, an antimicrobial, and the like is applied to the surface of the resin layer using gravure coating or the like, the grain-finished leather-like sheet exhibits excellent wettability with the aqueous treating liquid having high polarity. When another material is bonded to the surface of the resin layer using an adhesive, the grain-finished leather-like sheet exhibits particularly excellent adhesion to an adhesive containing an aqueous polyurethane, and a hot-melt polyurethane adhesive.

EXAMPLES

Hereinafter, the present invention will be described in further detail by way of examples. It should be appreciated that the scope of the present invention is by no means limited by the examples. In the following, “part(s)” and “%” are based on mass unless otherwise specified.

First, the evaluation methods used in the present examples will be collectively described below.

[Calculation of Polar Components and Dispersive Components of Surface Free Energy of Polyurethane and Skin Layer]

Using pure water and diiodomethane (methylene iodide) as test liquids, the polar component and the dispersive component of the surface free energy of each of the polyurethane and the skin layer were analyzed according to the OWRK method.

Specifically, as for the surface free energy of the polyurethane, an emulsion of a polyurethane is poured into a mold of a predetermined size on which release paper having a smooth surface was placed, and the emulsion was dried to form a polyurethane film having a thickness of about 50 mm.

Then, on a surface of the polyurethane film, 1 μL of the respective droplets of pure water and diiodomethane were dropped using a syringe, and the contact angle to each of the droplets was measured using a contact angle meter (CA-DT manufactured by Kyowa Interface Science Co., Ltd.). Note that the measurement environment was in an atmosphere at 25° C. and 50 RH %.

Then, using the following expression (1) based on the OWRK analysis, simultaneous equations were solved to calculate a polar component $\gamma^p$ and a dispersive component $\gamma^d$ of the surface free energy of the surface of the polyurethane film.

$$1+\cos\theta = 2\left[\left(\Upsilon^{d}\cdot\Upsilon_L^{d}\right)/\Upsilon_L^{2}\right]^{1/2} + 2\left[\left(\Upsilon^{p}\cdot\Upsilon_L^{p}\right)/\Upsilon_L^{2}\right]^{1/2}$$

expression (1)

The symbols in the expression (1) represent the following.

$\gamma^d$: Dispersive component of surface free energy of surface of polyurethane film (mJ/m$^2$)

$\gamma^p$: Polar component of surface free energy of surface of polyurethane film (mJ/m$^2$)

θ: Contact angle of each test liquid (°)

$\gamma_L{}^d$: Dispersive component of surface free energy of each test liquid (mJ/m$^2$) (water: 21.8 mJ/m$^2$, diiodomethane: 49.5 mJ/m$_2$)

$\gamma_L{}^p$: Polar component of surface free energy of each test liquid (mJ/m$^2$) (water: 51.0 mJ/m$^2$, diiodomethane: 1.3 mJ/m$^2$)

$\gamma_L$: Surface free energy of test liquid

Similarly, a skin-layer coating liquid for forming a skin layer of the grain-finished leather-like sheet was used to form a film, and the contact angle of the surface of the skin layer to each of pure water and diiodomethane was measured. Using the expression (1) based on the OWRK analysis, a polar component $\gamma^p$ and a dispersive component $\gamma^d$ of the surface free energy of the skin layer of the grain-finished leather-like sheet were calculated.

[Number-Average Molecular Weight of Water-Soluble Polymer]

The number-average molecular weight was determined as a value in terms of standard polystyrene by performing gel permeation chromatography (GPC) measurement under the following conditions.

(GPC Measurement Condition)

Apparatus: “CBM-20A” manufactured by SHIMADZU CORPORATION

Mobile phase: N,N-dimethylformamide (flow rate: 1 mL/min)

Column: KD-806M manufactured by Shodex

Detector: differential refractometer

Measurement temperature: 40° C.

Standard substance: polystyrene manufactured by Tosoh Corporation

Injection volume: 50 μL

Sample concentration: 2 mg/2 cc

[Water Resistance of Skin Layer]

A film piece measuring 3 cm by 3 cm was cut out from the film forming the skin layer of the grain-finished leather-like sheet. Then, the film piece was immersed in water at 25° C. for 24 hours, and thereafter removed. Then, the weight of the film piece from which excess water had been wiped off immediately after removal was measured, and the weight swelling rate (%) was calculated according to the following expression.

$$\text{Weight swelling rate}(\%) = \{(\text{weight after swelling} - \text{weight before immersion})/\text{weight before immersion}\} \times 100$$

Based on the obtained value of the weight swelling rate, the water resistance was evaluated according to the following evaluation criteria.

Excellent: weight swelling rate was less than 5%

Good: weight swelling rate was 5% or more and less than 15%

Poor: weight swelling rate was 15% or more

[Wettability of Surface of Skin Layer]

The wettability of the surface of the skin layer of the grain-finished leather-like sheet was measured in accordance with JIS K 6768. Specifically, a wetting tension testing liquid mixture (Wetting tension testing liquid mixture: 65 $mJ/m^2$, manufactured by KANTO CHEMICAL CO., INC.) was applied in a wet film thickness of 12 μm on the surface of the skin layer of the grain-finished leather-like sheet using a wireless bar coater. Then, the wettability was evaluated as "High" if the liquid film remained unbroken for 5 seconds or more, "Medium" if the liquid film broke in 2 seconds or more and less than 5 seconds, and "Low" if the liquid film broke in less than 2 seconds.

[Secondary Adhesion of Surface of Skin Layer]

The grain-finished leather-like sheet, a hot-melt tape, and a plain woven fabric, each cut into a strip measuring 150 mm long and 30 mm wide, were prepared. Here, as the hot-melt tape, a thermoplastic urethane-based hot-melt tape (NASA-T manufactured by Sambu Fine Chemical) having a thickness of 200 μm was used. The plain woven fabric had a basis weight of 1.3 $g/m^2$.

Then, a superposed body, obtained by stacking the hot-melt tape and the plain woven fabric in this order on the surface of the skin layer of the grain-finished leather-like sheet, was pressure-boned for 30 seconds at a temperature of 130° C. and a pressure of 6 $kgf/cm^2$, to produce a test piece. Here, at only one end of the test piece, a region of 30 mm in the length direction from the end was left as an unbonded portion, and the remaining area of 120 mm in the length direction was bonded.

Then, the peel strength of the hot-melt tape bonded to the surface of the skin layer of the grain-finished leather-like sheet was measured using a tensile tester. Specifically, one end of the grain-finished leather-like sheet on the unbonded side and one end of the plain woven fabric on the unbonded side of the obtained test piece were held by an upper chuck and a lower chuck, respectively, of the tensile tester, and the peel strength between the hot-melt tape and the surface of the skin layer was measured at a test speed of 50 mm/min.

Then, the secondary adhesion was evaluated as "Excellent" when the peel strength was 3.0 kg/cm or more, and the skin layer underwent material failure and peeled, "Good" when the peel strength was 3.0 kg/cm or more, but the skin layer did not undergo material failure, and "Poor" when the peel strength was less than 3.0 kg/cm.

The raw materials used in the examples will be collectively described below.

(Emulsion of Polyurethane for Skin Layer)

Emulsion of polyurethane A: an emulsion of a polyether-based polyurethane having a solid content of 35% (HYDRAN ULK-190, manufactured by DIC Corporation)

Emulsion of polyurethane B: an emulsion of a polyether-based polyurethane having a solid content of 30% (HYDRAN ULK-003, manufactured by DIC Corporation)

Emulsion of polyurethane C: an emulsion of a polyester/polyether-based polyurethane having a solid content of 45% (HYDRAN CRS-086, manufactured by DIC Corporation)

Emulsion of polyurethane D: an emulsion of an anionic self-emulsified polycarbonate-based polyurethane having a solid content of 40, (100% modulus of 3.0 MPa)

Emulsion of polyurethane E: an emulsion of a polycarbonate-based polyurethane having a solid content of 30% (HYDRAN WLS-290SG manufactured by DIC Corporation)

(Emulsion of Polyurethane for Adhesion Layer)

Emulsion of a polyether-based polyurethane having a solid content of 55% (HYDRAN WLA-451TA, manufactured by DIC Corporation)

(Nonionic Compound)

Nonionic compound E: a silicone-based compound having an HLB value=12 (polyether-modified polydimethylsiloxane, silicone oil KF-351A, manufactured by Shin-Etsu Chemical Co., Ltd.)

Nonionic compound F: a silicone-based compound having an HLB value=10 (polyether-modified polydimethylsiloxane, silicone oil KF-353, manufactured by Shin-Etsu Chemical Co., Ltd.)

Nonionic compound G: a silicone-based compound having an HLB value=16 (polyether-modified polydimethylsiloxane, silicone oil KF-354L, manufactured by Shin-Etsu Chemical Co., Ltd.)

Nonionic compound H: a silicone-based compound having an HLB value=7 (polyether-modified polydimethylsiloxane, silicone oil KF-352A, manufactured by Shin-Etsu Chemical Co., Ltd.)

Nonionic compound I: an acetylene glycol-based nonionic surfactant having an HLB value=13 (SURFYNOL 465 manufactured by Nissin Chemical Industry Co., Ltd.)

Nonionic compound X: a polyoxyethylene alkyl ether-based nonionic compound having an HLB value=18 (NIKKOL BC-23 manufactured by Nikko Chemicals Co., Ltd.)

(Aqueous Solution of Water-Soluble Polymer)

Aqueous solution of water-soluble polymer J: an aqueous solution of a polyether polyol-based urethane polymer (polyurethane-modified polyoxyalkylene) having a number-average molecular weight of 68,000 (solid content 47.6%, ADEKANOL UH-541VF, manufactured by ADEKA CORPORATION)

Aqueous solution of water-soluble polymer K: an aqueous solution obtained by diluting polyethylene glycol having a number-average molecular weight of 20,000 (manufactured by FUJIFILM Wako Pure Chemical Corporation) to a solid content of 50%.

Aqueous solution of water-soluble polymer L: an aqueous solution obtained by diluting polyethylene oxide having a number-average molecular weight of 110,000 (ALKOX L-11 manufactured by Meisei Chemical Works, Ltd.) to a solid content of 50%

Aqueous solution of water-soluble polymer M: an aqueous solution obtained by diluting polyethylene glycol having a number-average molecular weight of 8,000 (manufactured by FUJIFILM Wako Pure Chemical Corporation) to a solid content of 50%

Aqueous solution of water-soluble polymer Y: an aqueous solution obtained by diluting polyethylene glycol having a number-average molecular weight of 500,000 (manufactured by FUJIFILM Wako Pure Chemical Corporation) to a solid content of 50%

(Fiber Substrate)

A fiber substrate including a non-woven fabric of polyethylene terephthalate (PET) fibers having an average fineness of 0.1 dtex and a polyurethane impregnated into the non-woven fabric, and having a PET/polyurethane ratio of 90/10, a basis weight of 530 g/m$^2$, and a thickness of 1 mm.

Example 1

A skin-layer coating liquid and an adhesion-layer coating liquid were prepared by mixing the above-described raw materials such that the solids thereof had the following blending compositions.

(Skin-Layer Coating Liquid)

Polyurethane A 100 parts (95.5%) (parts by mass (mass %), the same applies to the following)

Nonionic compound E 1.4 parts (1.3%)

Water-soluble polymer J 3.4 parts (3.2%)

(Adhesion-Layer Coating Liquid)

Polyurethane for adhesion layer 100 parts

Crosslinking agent 17 parts

Leveling agent 0.5 parts

Thickener 0.5 parts

Then, the skin-layer coating liquid was applied in a wet adhesion amount of 120 g/m$^2$ onto the mold release surface of release paper, and dried by heating for 5 minutes using a dryer at 90° C., to produce a skin-layer film. Then, the adhesion-layer coating liquid was applied in a wet adhesion amount of 130 g/m onto the surface of the skin-layer film, and dried by heating using a dryer at 90° C. for 5 minutes, to stack an adhesion-layer film on the surface of the skin-layer film. Then, the resulting laminate of the skin-layer film and the adhesion-layer film formed on the release paper was placed on top of the surface of a fiber substrate such that the adhesion-layer film was faced to the fiber substrate, and the whole was pressed using a flat-plate hot pressing machine, to attach the fiber substrate and the laminate together. Here, the pressing was performed for 10 seconds at a temperature of 100° C. and a pressure of 5 kgf/cm. After the pressing, aging was further performed for 72 hours at 70° C., thus allowing the crosslinking of the polyurethane for the adhesion layer to proceed.

The release paper was released from the thus obtained laminate, to obtain a grain-finished leather-like sheet of Example 1, which included a fiber substrate, and a resin layer including a skin layer stacked on one side of the fiber substrate. The obtained grain-finished leather-like sheet included a skin layer having a thickness of 50 μm, and had a thickness of 0.1 mm and a basis weight of 640 g/m$^2$. Then, the evaluations were performed according to the above-described evaluation methods. The results are shown in Table 1 below.

TABLE 1

| | Surface layer of grain-finished leather-like sheet | | Aqueous polyurethane | | | Nonionic surfactant | | |
|---|---|---|---|---|---|---|---|---|
| Example No. | Polar component (mJ/m$^2$) | Dispersive component (mJ/m$^2$) | Type | Polar component (mJ/m$^2$) | Dispersive component (mJ/m$^2$) | Type | HLB value | Type |
| Ex. 1 | 39.6 | 33.8 | A | 16.0 | 35.8 | E | 12 | Silicone-based |
| Ex. 2 | 37.2 | 35.2 | A | 16.0 | 35.8 | E | 12 | Silicone-based |
| Ex. 3 | 37.8 | 34.4 | A | 16.0 | 35.8 | E | 12 | Silicone-based |
| Ex. 4 | 27.3 | 34.1 | A | 16.0 | 35.8 | E | 12 | Silicone-based |
| Ex. 5 | 37.8 | 34.1 | A | 16.0 | 35.8 | E | 12 | Silicone-based |
| Ex. 6 | 28.2 | 35.9 | A | 16.0 | 35.8 | F | 10 | Silicone-based |
| Ex. 7 | 38.1 | 35.8 | A | 16.0 | 35.8 | G | 16 | Silicone-based |
| Ex. 8 | 35.7 | 35.3 | A | 16.0 | 35.8 | I | 13 | Acetylene glycol-based |
| Ex. 9 | 36.7 | 34.6 | A | 16.0 | 35.8 | E | 12 | Silicone-based |
| Ex. 10 | 38.2 | 35.2 | A | 16.0 | 35.8 | E | 12 | Silicone-based |
| Ex. 11 | 30.5 | 36.5 | B | 3.6 | 36.3 | E | 12 | Silicone-based |
| Ex. 12 | 38.6 | 35.7 | C | 21.1 | 35.8 | E | 12 | Silicone-based |
| Ex. 13 | 33.6 | 36.1 | A | 16.0 | 35.8 | E | 12 | Silicone-based |
| Ex. 14 | 38.7 | 33.3 | A | 16.0 | 35.8 | E | 12 | Silicone-based |
| Com. Ex. 1 | 20.3 | 36.6 | A | 16.0 | 35.3 | E | 12 | Silicone-based |
| Com. Ex. 2 | 19.7 | 38.7 | A | 16.0 | 35.8 | H | 7 | Silicone-based |
| Com. Ex. 3 | 22.3 | 26.3 | D | 8.6 | 23.6 | E | 12 | Silicone-based |
| Com. Ex. 4 | 16.3 | 36.2 | A | 16.0 | 35.8 | — | — | — |
| Com. Ex. 5 | 18 | 36.8 | A | 16.0 | 35.8 | — | — | — |
| Com. Ex. 6 | 17.2 | 36.2 | A | 16.0 | 35.8 | E | 12 | Silicone-based |

TABLE 1-continued

| | | | | | | | | |
|---|---|---|---|---|---|---|---|---|
| Com. Ex. 7 | 22 | 36.8 | A | 16.0 | 35.8 | X | 18 | Polyoxyethylene alkyl ether-based |
| Com. Ex. 8 | 24.3 | 35.4 | A | 16.0 | 35.8 | E | 12 | Silicone-based |
| Com. Ex. 9 | 42 | 33 | A | 16.0 | 35.8 | E | 12 | Silicone-based |
| Com. Ex. 10 | 21.2 | 42 | E | 5.5 | 41.1 | H | 7 | Silicone-based |

| | Nonionic surfactant | Water-soluble polymer | | | Evaluation results | | |
|---|---|---|---|---|---|---|---|
| Example No. | Content (parts by mass) | Type | Content (parts by mass) | Number-average molecular weight | Wettability | Water resistance | Secondary adhesion |
| Ex. 1 | 1.4 | J | 3.4 | 68000 | High | Excellent | Excellent |
| Ex. 2 | 1.4 | K | 3.4 | 20000 | High | Excellent | Good |
| Ex. 3 | 1.4 | L | 3.4 | 110000 | High | Good | Excellent |
| Ex. 4 | 0.8 | J | 3.4 | 68000 | Medium | Excellent | Excellent |
| Ex. 5 | 4.5 | J | 3.4 | 68000 | High | Good | Excellent |
| Ex. 6 | 1.4 | J | 3.4 | 68000 | Medium | Excellent | Excellent |
| Ex. 7 | 1.4 | J | 3.4 | 68000 | High | Good | Excellent |
| Ex. 8 | 1.4 | J | 3.4 | 68000 | High | Excellent | Excellent |
| Ex. 9 | 1.4 | J | 1.5 | 68000 | High | Excellent | Good |
| Ex. 10 | 1.4 | J | 9.5 | 68000 | High | Good | Excellent |
| Ex. 11 | 2.5 | J | 3.4 | 68000 | High | Excellent | Good |
| Ex. 12 | 1.4 | J | 3.4 | 68000 | High | Good | Excellent |
| Ex. 13 | 1.4 | J | 0.7 | 68000 | High | Excellent | Good |
| Ex. 14 | 1.4 | M | 9.5 | 8000 | High | Excellent | Good |
| Com. Ex. 1 | 0.6 | J | 3.4 | 68000 | Low | Excellent | Excellent |
| Com. Ex. 2 | 5.0 | J | 3.4 | 68000 | Low | Excellent | Excellent |
| Com. Ex. 3 | 1.4 | J | 9.5 | 68000 | Low | Excellent | Poor |
| Com. Ex. 4 | — | — | — | — | Low | Excellent | Poor |
| Com. Ex. 5 | — | J | 3.4 | 68000 | Low | Excellent | Excellent |
| Com. Ex. 6 | 0.6 | — | — | — | Low | Excellent | Excellent |
| Com. Ex. 7 | 1.4 | J | 3.4 | 68000 | High | Poor | Poor |
| Com. Ex. 8 | 1.4 | Y | 3.4 | 500000 | High | Poor | Poor |
| Com. Ex. 9 | 4.5 | J | 9.5 | 68000 | High | Poor | Poor |
| Com. Ex. 10 | 5 | J | 3.4 | 68000 | Low | Excellent | Poor |

Example 2

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (95.5%)

Nonionic compound E 1.4 parts (1.3%)

Water-soluble polymer K 3.4 parts (3.2%)

Example 3

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (95.5%)

Nonionic compound E 1.4 parts (1.3%)

Water-soluble polymer L 3.4 parts (3.2%)

Example 4

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (95.9%)

Nonionic compound E 0.8 parts (0.8%)

Water-soluble polymer J 3.4 parts (3.3%)

Example 5

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (92.6%)

Nonionic compound E 4.5 parts (4.2%)

Water-soluble polymer J 3.4 parts (3.2%)

Example 6

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (95.5%)
Nonionic compound F 1.4 parts (1.3%)
Water-soluble polymer J 3.4 parts (3.2%)

Example 7

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (95.5%)
Nonionic compound G 1.4 parts (1.3%)
Water-soluble polymer J 3.4 parts (3.2%)

Example 8

A grain-finished leather-like sheet was produced and evaluated in the same manner as in Example 1 except of using a skin-layer coating liquid prepared such that the solid thereof had the following blending composition as the skin-layer coating liquid. The results are shown in Table 1.

Polyurethane A 100 parts (95.5%)
Nonionic compound I 1.4 parts (1.3%)
Water-soluble polymer J 3.4 parts (3.2%)

Example 9

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (97.1%)
Nonionic compound E 1.4 parts (1.4%)
Water-soluble polymer J 1.5 parts (1.5%)

Example 10

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (90.1%)
Nonionic compound E 1.4 parts (1.3%)
Water-soluble polymer J 9.5 parts (8.6%)

Example 11

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane B 100 parts (94.4%)
Nonionic compound E 2.5 parts (2.4%)
Water-soluble polymer J 3.4 parts (3.2%)

Example 12

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane C 100 parts (95.5%)
Nonionic compound E 1.4 parts (1.3%)
Water-soluble polymer J 3.4 parts (3.2%)

Example 13

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (97.9%)
Nonionic compound E 1.4 parts (1.4%)
Water-soluble polymer J 0.7 parts (0.7%)

Example 14

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (90.2%)
Nonionic compound E 1.4 parts (1.2%)
water-soluble polymer M 9.5 parts (8.6%)

Comparative Example 1

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (96.1%)
Nonionic compound E 0.6 parts (0.6%)
Water-soluble polymer J 3.4 parts (3.3%)

Comparative Example 2

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (92.3%)
Nonionic compound H 5.0 parts (4.6%)
Water-soluble polymer J 3.4 parts (3.1%)

Comparative Example 3

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane D 100 parts (90.1%)
Nonionic compound E 1.4 parts (1.3%)
Water-soluble polymer J 9.5 parts (8.6%)

Comparative Example 4

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (100%)

Comparative Example 5

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (96.71)

Water-soluble polymer J 3.4 parts (3.3%)

Comparative Example 6

A grain-finished leather-like sheet was produced and evaluated in the same manner as in Example 1 except for using a skin-layer coating liquid prepared such that the solid thereof had the following blending composition as the skin-layer coating liquids. The results are shown in Table 1.

Polyurethane A 100 parts (99.4%)

Nonionic compound E 0.6 parts (0.6%)

Comparative Example 7

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (95.5%)

Nonionic compound X 1.4 parts (1.3%)

Water-soluble polymer J 3.4 parts (3.2%)

Comparative Example 8

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (95.5%)

Nonionic compound E 1.4 parts (1.3%)

Water-soluble polymer Y 3.4 parts (3.2%)

Comparative Example 91

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane A 100 parts (87.8%)

Nonionic compound E 4.5 parts (3.9%)

Water-soluble polymer J 9.5 parts (8.3%)

Comparative Example 10

A grain-finished leather-like sheet was produced and evaluated in the same manner as in Example 1 except for using, as the skin-layer coating liquid, a skin-layer coating liquid prepared such that the solid thereof had the following blending composition. The results are shown in Table 1.

Polyurethane E 100 parts (92.3%)

Nonionic compound H 5 parts (4.6%)

Water-soluble polymer J 3.4 parts (3.1%)

Referring to Table 1, the grain-finished leather-like sheets obtained in Examples 1 to 14, which had a skin layer according to the present invention that included a polyurethane, a nonionic compound having an HLB value of 10 to 16, and a water-soluble polymer, and that had a polar component of 25 to 40 mJ/m$^2$ and a dispersive component of 30 to 40 mJ/m$^2$, all had wettability evaluated as "Medium" or higher, water resistance evaluated as "Good" or higher, and secondary adhesion evaluated as "Good" or higher.

On the other hand, the grain-finished leather-like sheet obtained in Comparative Example 1, which had a polar component of less than 25 mJ/m$^2$ due to the excessively low content ratio of the nonionic compound, had low wettability. The grain-finished leather-like sheet obtained in Comparative Example 2, which used a nonionic compound having an HLB value of less than 10, had a polar component of less than 25 mJ/m$^2$ and therefore had low wettability despite the high content ratio of the nonionic compound. The grain-finished leather-like sheet obtained in Comparative Example 3, which used an aqueous polyurethane having a low polar component and a low dispersive component, also had a polar component of less than 25 mJ/m$^2$ and a dispersive component of less than 30 mJ/m$^2$, and therefore had low wettability and poor secondary adhesion despite the large blending amount of the water-soluble polymer.

The grain-finished leather-like sheet obtained in Comparative Example 4, which contained neither a nonionic compound nor a water-soluble polymer, and had a polar component of less than 25 mJ/m$^2$, had excellent water resistance, but had low wettability and poor secondary adhesion.

The grain-finished leather-like sheet obtained in Comparative Example 5, in which only a water-soluble polymer was blended in the skin layer as compared with the grain-finished leather-like sheet obtained in Comparative Example 4, had increased secondary adhesion, but also had a polar component of less than 25 mJ/m$^2$ and therefore had low wettability.

The grain-finished leather-like sheet obtained in Comparative Example 6, in which only a nonionic compound was blended in the skin layer as compared with the grain-finished leather-like sheet obtained in Comparative Example 4, had increased secondary adhesion, but also had a polar component of less than 25 mJ/m$^2$ and therefore had low wettability.

The grain-finished leather-like sheet obtained in Comparative Example 7, in which a nonionic compound having an HLB value of greater than 16 was used in the skin layer, had increased wettability, but also had a polar component of less than 25 mJ/m$^2$ and therefore had reduced water resistance and reduced secondary adhesion. The grain-finished leather-like sheet obtained in Comparative Example 8, which used a water-soluble polymer having a high number-average molecular weight, had increased wettability, but also had a polar component of less than 25 mJ/m$^2$ and therefore had reduced water resistance and reduced secondary adhesion.

The grain-finished leather-like sheet obtained in Comparative Example 9, in which a nonionic compound having an HLB value of 12 and a water-soluble polymer were blended in high proportions, had a polar component of greater than 40 mJ/m$^2$ and therefore had reduced water resistance and reduced secondary adhesion although the wettability was increased. The grain-finished leather-like sheet obtained in Comparative Example 10, which used an aqueous polyurethane with a high dispersive component, also had a dispersive component of greater than 40 mJ/m$^2$ and therefore had reduced wettability and reduced secondary adhesion although the water resistance was increased.

REFERENCE SIGNS LIST

1 Fiber substrate
2 Resin layer
**2*a*** Skin layer
**2*b*** Intermediate layer
**2*c*** Adhesion layer
10 Grain-finished leather-like sheet

The invention claimed is:

1. A grain-finished leather-like sheet comprising:
a fiber substrate; and
a resin layer stacked on one side of the fiber substrate, wherein the resin layer comprises at least a skin layer, and the skin layer comprises a polyurethane, a nonionic compound having an HLB value of 10 to 16, and a water-soluble polymer, and has surface free energy including a polar component of 25 to 40 $mJ/m^2$ and a dispersive component of 30 to 40 $mJ/m^2$, as analyzed according to the Owens-Wendt-Rabel-Kaelble method.

2. The grain-finished leather-like sheet according to claim 1, wherein the polyurethane has surface free energy including a polar component of 5 to 20 $mJ/m^2$ and a dispersive component of 30 to 40 $mJ/m^2$, as analyzed according to the Owens-Wendt-Rabel-Kaelble method.

3. The grain-finished leather-like sheet according to claim 1, wherein the polyurethane is an aqueous polyurethane.

4. The grain-finished leather-like sheet according to claim 1, wherein the nonionic compound comprises at least one of a silicone-based compound and an acetylene glycol-based compound.

5. The grain-finished leather-like sheet according to claim 1, wherein the skin layer comprises the nonionic compound in an amount of 0.8 to 5.0 mass %.

6. The grain-finished leather-like sheet according to claim 1, wherein the water-soluble polymer has a number-average molecular weight of 10,000 to 150,000.

7. The grain-finished leather-like sheet according to claim 1, wherein the skin layer comprises the water-soluble polymer in an amount of 1.0 to 10 mass %.

8. The grain-finished leather-like sheet according to claim 1, wherein the water-soluble polymer comprises a polyurethane-modified polyoxyalkylene.

9. The grain-finished leather-like sheet according to claim 1, wherein the skin layer is a poreless continuous film having a thickness of 10 to 100 μm.

10. The grain-finished leather-like sheet according to claim 1, wherein the resin layer comprises an adhesion layer that bonds the fiber substrate, the adhesion layer including a polyurethane and having a thickness of 30 to 120 μm.

11. The grain-finished leather-like sheet according to claim 1, wherein the nonionic compound comprises a polyether-modified polydimethylsiloxane.

12. The grain-finished leather-like sheet according to claim 11, wherein the polyether-modified polydimethylsiloxane is in an oily state.

13. The grain-finished leather-like sheet according to claim 1, wherein the skin layer comprises a polyether-modified polydimethylsiloxane in an amount of 0.8 to 5.0 mass % as the nonionic compound, and comprises a polyurethane-modified polyoxyalkylene having a number-average molecular weight of 10,000 to 150,000 in an amount of 1.0 to 10 mass % as the water-soluble polymer.

14. The grain-finished leather-like sheet according to claim 13, wherein the polyurethane has surface free energy including a polar component of 5 to 20 $mJ/m^2$ and a dispersive component of 30 to 40 $mJ/m^2$, as analyzed according to the Owens-Wendt-Rabel-Kaelble method.

15. The grain-finished leather-like sheet according to claim 14, wherein the polyurethane is an aqueous polyurethane.

16. The grain-finished leather-like sheet according to claim 13, wherein the polyurethane is an aqueous polyurethane.

* * * * *